United States Patent [19]

Kraft et al.

[11] 4,284,327
[45] Aug. 18, 1981

[54] MICROSCOPE WITH ATTACHABLE ILLUMINATING DEVICES

[75] Inventors: Winfried Kraft, Asslar-Werdorf; Robert Lisfeld, Greifenstein-Ulm; Willi Hagner, Solms-Oberbiel; Karl Wieber, Asslar; Horst Frimmel, Wetzlar-Hermannstein, all of Fed. Rep. of Germany

[73] Assignee: Ernst Leitz Wetzlar GmbH, Wetzlar, Fed. Rep. of Germany

[21] Appl. No.: 115,149

[22] Filed: Jan. 25, 1980

[30] Foreign Application Priority Data

Jan. 26, 1979 [DE] Fed. Rep. of Germany ....... 2902961

[51] Int. Cl.³ ...................... G02B 21/06; G02B 21/24
[52] U.S. Cl. .................................................... 350/87
[58] Field of Search ................................. 350/87–91; 362/296, 455, 347

[56] References Cited

U.S. PATENT DOCUMENTS

| | | | |
|---|---|---|---|
| 3,360,641 | 12/1967 | Korte | 350/87 |
| 3,754,809 | 8/1973 | Harrison | 350/87 |
| 4,148,552 | 4/1979 | Suzuki et al. | 350/87 |

*Primary Examiner*—Jon W. Henry
*Attorney, Agent, or Firm*—Schwartz, Jeffery, Schwaab, Mack, Blumenthal & Koch

[57] ABSTRACT

Disclosed is a microscope adapted for accepting one or more attachment illuminating devices, which have different dimensions and are designed to be supplied with electric power either from a source within the microscope or external to the microscope. The microscope comprises a microscope stand comprising a base and a vertical support member; at least one source of electrical energy located inside of the stand for powering an illuminating device; and first means, associated with the stand, for connecting any of a variety of attachment illuminating devices which have different dimensions and are designed to be supplied with electric power either from the electrical energy source or from an electrical energy source external to the microscope. This connecting means includes means, adapted to cooperate with complementary coupling means on each attachment illuminating device, for mechanically coupling an attachment illuminating device, and means, adapted to cooperate with complementary electrical coupling means on each attachment illuminating device which is designed to be supplied with electrical energy from the electrical energy source, for electrically coupling the electrical energy source with an attachment illuminating device which is designed to be supplied with electrical energy from said electrical source. Thus, the attachment means provide for direct standardized attachment of all attachment illuminating devices having different dimensions without the use of any size adapting means.

7 Claims, 5 Drawing Figures

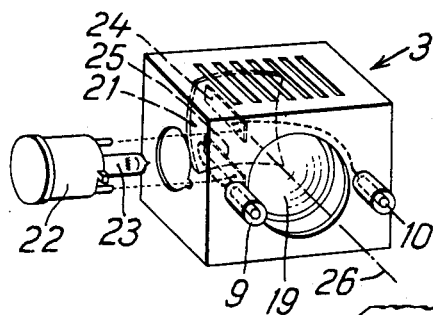
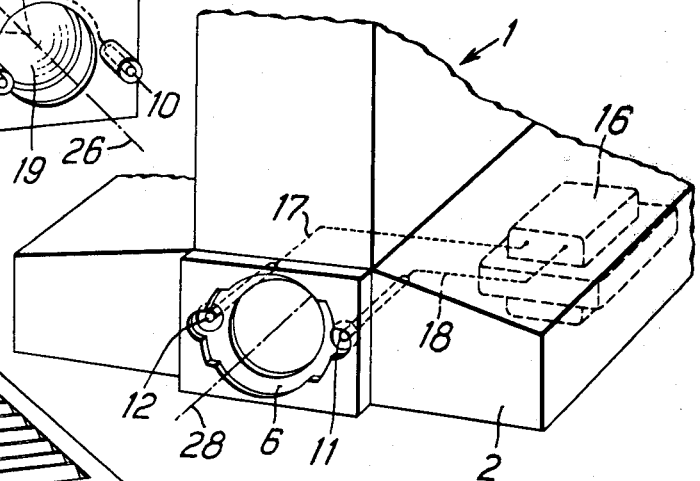
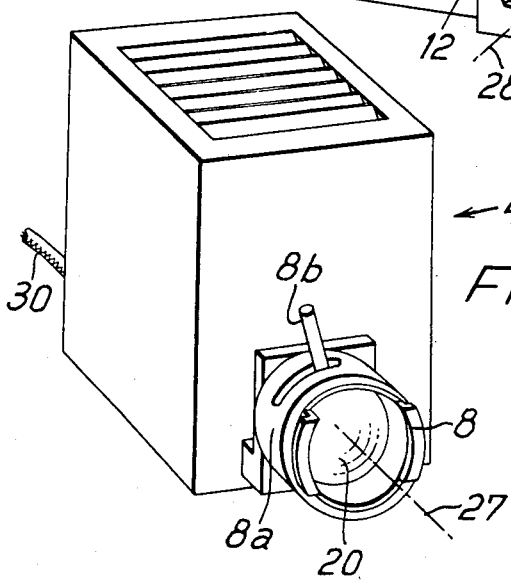

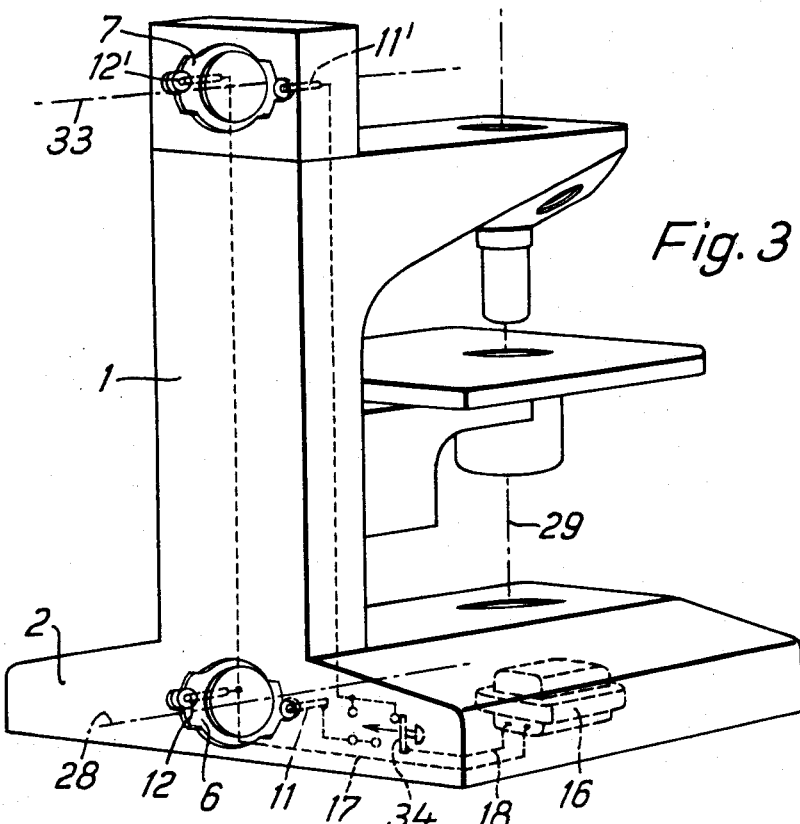
Fig. 3
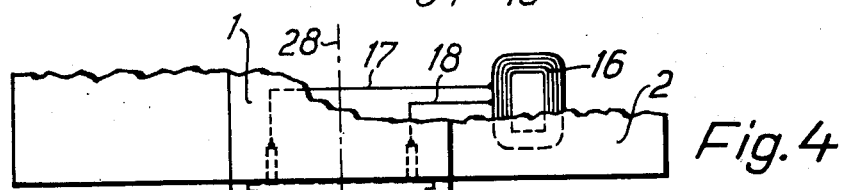
Fig. 4
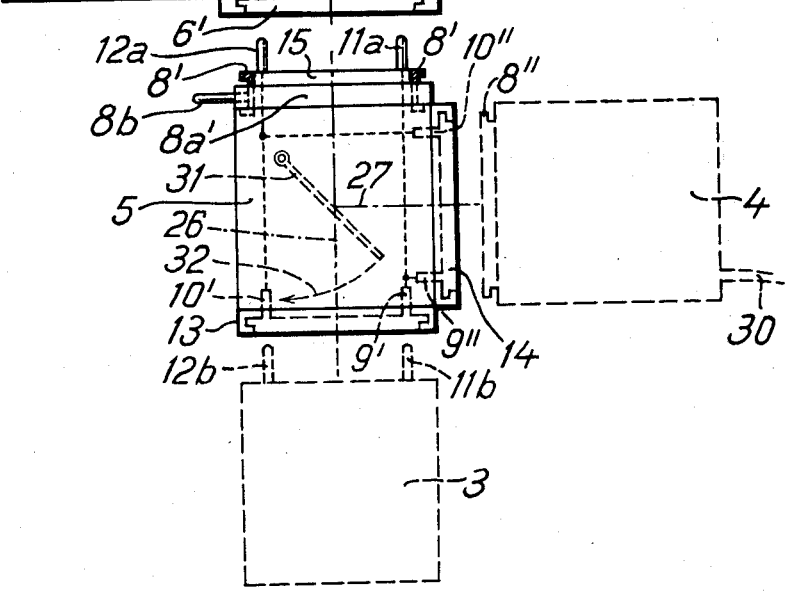

MICROSCOPE WITH ATTACHABLE ILLUMINATING DEVICES

BACKGROUND OF THE INVENTION

The present invention pertains to a microscope equipped with attachable illuminating devices, comprising within its stand at least one electric structural element for the illumination of the microscope and within or on its stand at least one connecting device for the mechanical flanging connection of an externally electrically supplied lamp housing attachment, or alternatively, for the simultaneous mechanical and electrical connection of a lamp housing attachment with an internal electrical supply.

Microscopes with a socket for the insertion of a built-in light, for example, a low voltage incandescent lamp, are known. In connection with such microscopes, the incandescent lamp is first pressed into a lamp holder and secured therein by turning, whereupon the lamp socket, equipped with a plug connection, is connected to the corresponding plug-in outlet on the microscope stand. If, in place of this built-in light, another source of light (e.g., with a higher capacity or with different physical characteristics of radiation) is required, then in the case of the known microscopes an illuminating tube with different dimensions must be mounted at the base of the microscope, or another connecting tube must be provided in the area of the back of the microscope stand. Only then is it possible to insert the other source of light, together with its lamp holder, into these intermediately-flange-mounted adapters or reducing sockets, thus effecting their mechanical and optical connection with the microscope.

Microscopes with permanently built-in sources of illumination, for example, in the base of the microscope, are also known. The insertion of stronger or physically different sources of light is, however, either entirely impossible with these devices, or may be accomplished only at the cost of complicated modifications of the apparatus.

SUMMARY OF THE INVENTION

It is therefore an object of the present invention to provide an improved microscope.

It is a further object of the present invention to provide a microscope which eliminates the disadvantages of known microscopes having attachable illuminating devices and to provide a standardized, universally applicable connecting device either on or in the stand of the microscope.

In accomplishing the foregoing objects, there has been provided in accordance with the present invention a microscope adapted for accepting one or more attachment illuminating devices, which have different dimensions and are designed to be supplied with electric power either from a source within the microscope or external to the microscope. The microscope comprises a microscope stand comprising a base and a vertical support member extending from the base; at least one source of electrical energy located inside of the stand for powering an illuminating device; and first means, associated with the stand, for connecting any one of a variety of attachment illuminating devices which have different dimensions and are designed to be supplied with electric power either from the electrical energy source or from an electrical energy source external to the microscope. This connecting means includes means, adapted to cooperate with complementary coupling means on each attachment illuminating device, for mechanically coupling an attachment illuminating device, and means, adapted to cooperate with complementary electrical coupling means on each attachment illuminating device which is designed to be supplied with electrical energy from the electrical energy source, for electrically coupling the electrical energy source with an attachment illuminating device which is designed to be supplied with electrical energy from the electrical energy source. Thus, the attachment means provide for direct standardized attachment of all attachment illuminating devices having different dimensions without the use of any size adapting means.

According to one preferred embodiment of the invention, the first connecting means is located in the vicinity of the base of the stand for producing a transmission illumination light beam, and the microscope further comprises a second connecting means identical to the first connecting means, wherein the second connecting means is located in the vicinity of the upper part of the vertical support member for providing an incident illumination light beam.

In accordance with another embodiment, the microscope further comprises an intermediate mirror housing connected to the microscope stand by means of the first connecting means. The mirror housing comprises means for mechanically and electrically coupling the mirror housing to the first connecting means, third and fourth means, identical with the first connecting means, for connecting any one of a variety of attachment illuminating devices which have different dimensions and are designed to be supplied with electric power either from the electrical energy source or from an electrical energy source external to the microscope, and a mirror displaceably mounted in the mirror housing so as to selectively produce an optical connection between the microscope and either of the attachment illuminating devices connected to the third and fourth connecting means.

According to another aspect of the invention, there has been provided a microscope assembly, comprising a microscope as defined above; and a plurality of attachment illuminating devices, each of which includes means for mechanically and electrically coupling the illuminating device to the first connecting means of the microscope, at least one of the illuminating devices comprising a device which is designed to be supplied with electric power from the electrical energy source of the microscope. This microscope assembly may also include the intermediate mirror housing defined above.

Further objects, features and advantages of the present invention will become apparent to a person skilled in the art from the detailed description of preferred embodiments which follows, when considered together with the attached figures of drawing.

BRIEF DESCRIPTION OF THE DRAWINGS

FIG. 1 is a partial perspective view of a microscope stand with the connecting device according to the invention;

FIG. 2a is a perspective view of an attachable lamp housing provided with means for internal electrical supply;

FIG. 2b is a perspective view of a larger attachable lamp housing with an external supply of electricity;

FIG. 3 is a perspective view of a microscope stand with two connecting devices according to the invention, one for transmission and one for incident light illumination; and FIG. 4 is a schematic view of an embodiment having an attachable mirror housing, to which different attachable lamp housings may be flange-mounted.

DESCRIPTION OF THE PREFERRED EMBODIMENTS

According to the invention, the connecting device comprises means for the mechanically flange-mounting and for electrically connecting all attachable, attachment lamp housings. On the lamp housings corresponding means are provided for mechanically mounting them and on attachment lamp housings supplied internally (from a source inside the microscope) with power, additional suitable means are provided for electrical connection to the connecting device, so that the direct mounting of all attachable, differently dimensioned attachment lamp housings, supplied externally or internally, becomes possible by means of the same connecting device without the intermediate insertion of connecting tubes, adapters, reducing sockets or the like.

Appropriately, the attachment lamp housing includes as its optical structural elements a preferably interchangeably mounted lamp, a reflector and a condenser lens.

According to a further embodiment of the invention, a mirror housing is additionally provided, which on the one hand, contains means for mechanically flange-mounting and for simultaneously electrically connecting it with the connecting device of the microscope stand, and on the other, at least two further connecting devices for the simultaneous attachment of attachment lamp housings, preferably of different dimensions or equipped with different physical sources of light. The mirror housing also contains a deflecting mirror to establish the optical connection with the respective attachment lamp housing brought into the operational position, said mirror being rotatable out of the beam path.

It is also possible to provide a first connecting device preferably in or on the base of the microscope stand to achieve a transmission illumination beam path and a second connecting device of the same type, preferably in the upper area of the microscope stand, for the attachment of a second attachable lamp housing to achieve an incident light illumination beam path.

Finally, additional electrical means may be provided, preferably on or in the microscope stand, for the simultaneous or alternating actuation of the light source of the first and/or the second attachment lamp housing.

Turning now to the drawings, FIG. 1 shows the foot 2 of a microscope stand 1, with the rear part of said base housing a connecting device 6 comprising, on the one hand, recesses effecting mechanical locking (known per se) in the rear wall of the base 2 of the stand 1, and on the other hand, electrical contact pins 11, 12 which are connected by means of electrical leads 17, 18, with the electrical component 16.

FIGS. 2a and 2b show attachment lamp housings having different dimensions. In FIG. 2a is shown an attachment lamp housing 3, which is to be supplied internally with electricity, together with the optical structural elements of the lamp 23, reflector 21 and condenser lens 19. An interchangeably mounted lamp socket 22 permits the changing of the light source 23 without difficulty. The attachment lamp housing 3 further has electrical contact sleeves 9 and 10 protruding from its flanging surface, which are wired to the contact plates 25 and 24. For the sake of clarity, the mechanically connecting elements which are also present, illustrated schematically in more detail in FIG. 2b, are not illustrated in FIG. 2a.

In FIG. 2b there is illustrated an attachment lamp housing 4 which is to be externally supplied with electric power, together with external electrical supply line 30 and mechanical connecting device 8. The latter consists of a cylindrical part 8a supported rotatably around an axis 27 and, arranged symmetrically at its end region, two peripheral, convex protrusions, having an angular axial cross section, which fit into corresponding recesses in the connecting device 6 in the wall area of the base 2 of the stand, said protrusions engaging the wall area of the base 2 of the stand after a certain amount of rotation of the handle 8b, thereby establishing a precision, a releasable mechanical connection.

Of the optical structure, FIG. 2b shows only the condenser lens 20, whereas the other components (lamp, reflector) are inside the housing.

Identical connecting devices 6 and 7 are illustrated in FIG. 3. By flange-mounting an attachment lamp housing 3 (FIG. 2a) or 4 (FIG. 2b) on the connecting device 6, a transmission illumination beam path is established along the optical axis 28. Correspondingly, an incident illumination light beam path may be effected by flange-mounting an attachable lamp housing on the connecting device 7. The electrical contact pins 11, 12 and 11', 12', are connected by means of leads 17 and 18, respectively, with the electrical supply unit housed inside the microscope. The purely schematic representation of FIG. 3 shows merely a sole electrical component 16. However, a plurality of actual electrical elements, such as transformers, potentiometers, line switches, voltage selector switches, fuses, indicating instruments, power-supply plugs, and the like, may be provided, which may be mounted, for example, on the internal side walls of the base 2 of the stand or on the internal ceiling of the vault of the base 2 of the stand or inside the columnar part of the microscope stand 1.

Furthermore, electrical means, e.g., in the form of switch 34, may be arranged preferably in or on the microscope stand, to actuate the illuminating device which is either flange-mounted at 7, or connected at 6 or 6', respectively, depending on the type of illumination required. This is especially appropriate when the two flange-mounted attachment lamp housings are to be internally supplied with electricity. The capacity of the electrical supply unit in the microscope stand is usually such that only one housing can be supplied adequately with energy, so that a selector switch also serves to prevent overloading. It is, however, also possible to dimension the electrical supply unit in a manner with respect to its capacity so that two attachment lamp housings 3, 3 having an internal electrical supply may be operated simultaneously.

In FIG. 4, an embodiment of the invention having an attachable mirror housing 5 is shown, to which in turn at least two detachable lamp housings 3, 3 or 4, 4 or 3,4 respectively, may be connected in the manner of an electrical dual outlet. The lamp housings may then be alternatingly inserted in the optical beam path, represented by the axis 28. For this purpose, it is necessary only to transpose the deflecting mirror 31 in the direction indicated by the illustrated circular arrow 32.

The mirror housing 5, on its side facing the connecting device 6', is provided with appropriate electrical contact means 11a, 12a, as described hereinabove in connection with FIG. 1. In principle, it is immaterial whether the contact pins 11, 12 are arranged in the connecting device 6 and the contact sleeves 9, 10 are provided on the attachment lamp housing 3, or vice versa. Thus, in FIG. 4 contact pins 11a, 12a are shown which are to be inserted in corresponding contact sleeves (not shown) in the connecting device 6'. In addition to this electrical connection, which in itself results in a certain mechanical clamping action, a releasable mechanical connection is established with the connecting device 6' housed in the base 2 of the stand (mechanical and electrical connecting device 15) by means of the mechanical means 8' which corresponds to the means designated in FIG. 2b by the reference numeral 8. A wire connection provided in the mirror housing 2 establishes the electrical connection between the schematically represented contact sleeves 9', 10' and 9", 10", respectively.

The attachment lamp housings 3,3 or 4,4, or 3,4, respectively, may in turn be attached to the connecting devices 13 or 14, which are equipped with mechanical and electrical means. FIG. 4 shows, for example, that the externally electrically supplied attachment lamp housing 4 is mechanically connected with the connecting device 14 and that the internally supplied attachment lamp housing 3 is mounted on the connecting device 13. This arrangement is preferred when, for example, a transmission illuminating light beam 26, 28, 29 is to be established by means of a 20 W light source and when, subsequently, a substantially stronger source of light, possibly an externally supplied 100 W light source, must be available to produce a correspondingly stronger transmission illuminating light beam 27, 28, 29. On the other hand, it may also be necessary for the microscope user to replace a conventional 20 W. light source, housed in an attachment lamp housing 3, with a physically different radiation source, for example, a Xe or a Hg lamp, which in practice is possible only by the complete replacement of the entire lamp housing (flange-mounting of an attachment lamp housing 4).

Obviously, the mirror housing 5 also affords the variant of attaching two similar attachable housings 3,3 or 4,4 simultaneously optically, mechanically and/or electrically to the microscope. This is convenient when, for example, for extended serial microscopic investigations an illuminating device is needed as a "reserve" in the case of a failure of the primary illuminating device. It is possible in this manner to effect a continuous series of investigations without reference or interruption, which, for example, in the observation and recording of dynamic processes in the specimen may be of particular importance. Means (known per se and thus not shown) may be provided for automatically changing the position of the mirror 31, in the event if a failure of the attachment lamp housing, or its light source, which is then in the operating position.

What is claimed is:

1. A microscope adapted for accepting one or more attachment illuminating devices, which have different dimensions and are designed to be supplied with electric power either from a source within the microscope or external to the microscope, said microscope comprising:

a microscope stand comprising a base and a vertical support member extending from said base;

at least one internal supply of electrical energy located inside of said stand for powering an illuminating device;

first means, associated with said stand, for connecting any one of a variety of attachment illuminating devices which have different dimensions and are designed to be supplied with electric power either from said internal supply of electrical energy or from an electrical energy supply external to the microscope, said connecting means including means, adapted to cooperate with complementary coupling means on each attachment illuminating device, for mechanically coupling an attachment illuminating device, and means, adapted to cooperate with complementary electrical coupling means on each attachment illuminating device which is designed to be supplied with electrical energy from said internal supply of electrical energy, for electrically coupling said internal supply of electrical energy with an attachment illuminating device which is designed to be supplied with electrical energy from said internal supply of electrical energy, whereby said attachment means provide for direct standardized attachment of attachment illuminating devices having different dimensions without the use of any size adapting means; and an intermediate mirror housing connected to said microscope stand by means of said first connecting means, said mirror housing comprising means for mechanically and electrically coupling said mirror housing to said first connecting means; second and third means, identical with said first connecting means, for connecting any of a variety of attachment illuminating devices which have different dimensions and are designed to be supplied with electric power either from said internal supply of electrical energy or from an electrical energy supply external to said microscope, and a mirror displaceably mounted in said mirror housing so as to selectively produce an optical connection between said microscope and either of the attachment illuminating devices connected to said second and third connecting means.

2. A microscope according to claim 1, wherein said first connecting means is located in the vicinity of the base of said stand for producing a transmission illumination light beam.

3. A microscope according to claim 2, further comprising a fourth connecting means identical to said first connecting means, said fourth connecting means being located in the vicinity of the upper part of said vertical support member for providing an incident illuminating light beam.

4. A microscope according to claim 3, further comprising means associated with said stand for selectively electrically connecting the electrical coupling means of said first and fourth connecting means to said internal supply of electrical energy.

5. A microscope according to claim 1, further comprising an attachment illuminating device connected to said microscope stand by means of said first connecting means.

6. A microscope according to claim 5, wherein said attachment illuminating means comprises a lamp, a reflector positioned behind said lamp and a condensor lens as optical elements.

7. A microscope assembly, comprising:

a microscope as defined according to claim 1; and a plurality of attachment illuminating devices, each of said illuminating devices including means for mechanically and electrically coupling and illuminating device to said first connecting means of said microscope, at least one of said illuminating devices comprising a device which is designed to be supplied with electric power from said internal supply of electrical energy of said microscope.

* * * * *